US012649380B2

(12) United States Patent (10) Patent No.: US 12,649,380 B2
Quint et al. (45) Date of Patent: Jun. 9, 2026

(54) ELECTRIC VEHICLE MULTIMODAL TRIP PLANNER

(71) Applicant: Rivian IP Holdings, LLC, Irvine, CA (US)

(72) Inventors: Jason Meyer Quint, Ann Arbor, MI (US); Jeff Mitsuo Ota, Morgan Hill, CA (US); Kyle Robert Underhill, Los Angeles, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 866 days.

(21) Appl. No.: 17/840,727

(22) Filed: Jun. 15, 2022

(65) Prior Publication Data

US 2023/0406131 A1 Dec. 21, 2023

(51) Int. Cl.
| | |
|---|---|
| *H02J 7/00* | (2026.01) |
| *B60L 1/00* | (2006.01) |
| *B60L 53/14* | (2019.01) |
| *B60L 53/57* | (2019.01) |
| *B60L 53/62* | (2019.01) |
| *B60L 58/12* | (2019.01) |
| *B60R 16/033* | (2006.01) |
| *G01C 21/34* | (2006.01) |
| *H02J 7/34* | (2006.01) |

(52) U.S. Cl.
CPC ................. *B60L 53/62* (2019.02); *B60L 1/00* (2013.01); *B60L 53/14* (2019.02); *B60L 53/57* (2019.02); *B60L 58/12* (2019.02); *B60R*

*16/033* (2013.01); *G01C 21/343* (2013.01); *H02J 7/342* (2020.01); *B60L 2200/12* (2013.01)

(58) Field of Classification Search
USPC ................................................... 320/104, 109
See application file for complete search history.

(56) References Cited

U.S. PATENT DOCUMENTS

| | | | | |
|---|---|---|---|---|
| 2012/0109519 A1* | 5/2012 | Uyeki | ..................... | B60L 53/68 |
| | | | | 701/426 |
| 2014/0095915 A1* | 4/2014 | Hitchcock | ............. | G06F 1/1632 |
| | | | | 713/323 |
| 2016/0097650 A1* | 4/2016 | Aich | ........................ | B60L 58/12 |
| | | | | 701/527 |
| 2018/0090942 A1* | 3/2018 | Nunez | ................... | H02J 7/0045 |
| 2021/0218073 A1* | 7/2021 | Duan | ...................... | B60L 53/66 |
| 2022/0294244 A1* | 9/2022 | Helm | ...................... | B60L 58/13 |

* cited by examiner

*Primary Examiner* — Samuel Berhanu
(74) *Attorney, Agent, or Firm* — HG LAW LLP

(57) ABSTRACT

Systems and methods are provided for allocating charge from an electric vehicle to a connected accessory device. The electric vehicle includes a charge port coupled to a vehicle battery and configured to connect to an accessory device. When the accessory device is connected to the charge port, charge is allocated from the vehicle battery to the accessory device based on a current state of charge (SOC) of the vehicle battery and energy requirements of the vehicle. The connection between the charge port and the accessory device may allow for the transfer of both power and data between the electric vehicle and the accessory device.

20 Claims, 6 Drawing Sheets

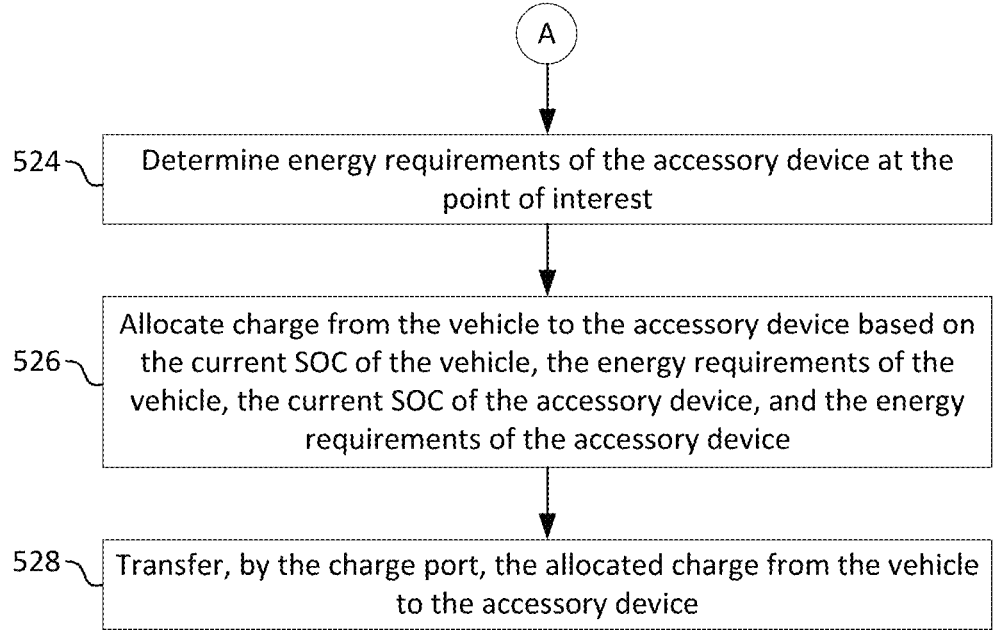

524 — Determine energy requirements of the accessory device at the point of interest 526 — Allocate charge from the vehicle to the accessory device based on the current SOC of the vehicle, the energy requirements of the vehicle, the current SOC of the accessory device, and the energy requirements of the accessory device 528 — Transfer, by the charge port, the allocated charge from the vehicle to the accessory device

FIG. 5(Cont.)

ELECTRIC VEHICLE MULTIMODAL TRIP PLANNER

INTRODUCTION

As the popularity of electric vehicles and electric devices continues to grow, electric vehicles are being increasingly configured to charge electric devices (e.g., accessory devices) with charge from the battery of the electric vehicle. However, when certain electric devices with relatively large capacity batteries (e.g., electric bikes, electric off-road vehicles ("quads"), electric scooters, electric surfboards, etc.) are charged by the electric vehicle, the range of the electric vehicle may be decreased. Accordingly, during a trip, it may be difficult for a user of the electric vehicle (e.g., a driver) to determine if accessory devices are able to be charged by the electric vehicle, while still leaving enough charge for the electric vehicle to reach the next vehicle charger. In one approach, to reduce range anxiety before reaching a vehicle charger, the user may choose not to charge any electric devices until reaching the vehicle charger to recharge the electric vehicle. However, in such an approach, the user may not stop at a nearby point of interest if the accessory devices the user intends to use are not charged. For example, if the user passes a bike trail (e.g., bicycle trail) along a route to a charger, but the user's electronic bike (E-bike) is not charged, the user may continue past the bike trail to the charger to charge the electric vehicle and the E-bike. Thus, the user will be required to spend additional time driving back to the bike trail, as well as additional time charging both the electric vehicle and the E-bike.

SUMMARY

Consequently, what are needed are techniques to automatically allocate charge to connected accessory devices based on a current state of charge (SOC) of the vehicle battery and energy requirements of the electric vehicle. Additionally, as electric vehicles increasingly include wireless connectivity, it may be advantageous to provide a connection that allows the transfer of both data and power (e.g., by a single cable) between the electric vehicle and a connected accessory device, so that information of the connected accessory device (e.g., previous bike rides of an E-bike) may be automatically uploaded to a user profile associated with the accessory device (e.g., a cloud profile).

In some embodiments, to solve one or more of these problems, systems and methods are provided to improve the allocation of charge of an electric vehicle to connected accessory devices, and to improve the automatic upload of data from the connected accessory devices to a user profile. The electric vehicle includes a charge port coupled to a vehicle battery and configured to connect to an accessory device. The electric vehicle further includes processing circuitry configured to allocate charge from the vehicle battery to the accessory device based on a current state of charge (SOC) of the vehicle battery and energy requirements of the electric vehicle.

In some embodiments, the processing circuitry may be configured to allocate charge from the vehicle battery to the accessory device further based on a current SOC of an accessory battery of the accessory device.

In some embodiments, the charge port may be configured to transfer the allocated charge from the vehicle battery to the accessory device and retrieve data from the accessory device. The retrieved data may include the current SOC of the accessory battery.

In some embodiments, the charge port may be configured to transfer the allocated charge from the vehicle battery to the accessory device by a cable connecting the charge port to the accessory device, and retrieve data from the accessory device by the cable.

In some embodiments, the processing circuitry may be further configured to determine an adventure waypoint, an endpoint associated with a charging station, and the energy requirement of the electric vehicle by determining energy required to travel along a route to the endpoint with a stop at the adventure waypoint, based on route information of the route.

In some embodiments, the processing circuitry may be further configured to determine energy requirements of the accessory device at the adventure waypoint.

In some embodiments, the accessory device may be an electric bike, and the processing circuitry may be further configured to determine the energy requirements of the accessory device at the adventure waypoint by identifying a bike route of the electric bike, and determining energy required to travel along the bike route, based on route information of the bike route.

In some embodiments, the processing circuitry may be further configured to receive a user selection of the adventure waypoint.

In some embodiments, the adventure waypoint may be selected from among a plurality of adventure waypoints based on the current SOC of the vehicle battery and the energy requirements of the vehicle.

In some embodiments, the charging station may be a first charging station, and the processing circuitry may be further configured to determine whether the current SOC of the vehicle battery is sufficient to meet the determined energy requirements of the electric vehicle. In response to a determination that the current SOC of the vehicle battery is not sufficient to meet the determined energy requirements of the electric vehicle, the processing circuitry may be further configured to determine whether a charging waypoint associated with a second charging station is available along the route to the adventure waypoint. In response to a determination that a charging waypoint is available along the route, the processing circuitry may be further configured to control the charge port to transfer the allocated charge from the vehicle battery to the accessory device. In response to a determination that a charging waypoint is not available along the route, the processing circuitry may be further configured to allocate zero charge to the accessory device.

In some embodiments, a method is provided. The method includes detecting an accessory device coupled to a charge port of an electric vehicle, the charge port being coupled to a vehicle battery of the electric vehicle. The method further includes allocating charge from the vehicle battery to the accessory device based on a current state of charge (SOC) of the vehicle battery and energy requirements of the electric vehicle.

In some embodiments, a non-transitory computer-readable medium having non-transitory computer-readable instructions encoded thereon is provided. The instructions, when executed by processing circuitry, cause the processing circuitry to: detect an accessory device coupled to a charge port of an electric vehicle, the charge port being coupled to a vehicle battery of the electric vehicle; and allocate charge from the vehicle battery to the accessory device based on a current state of charge (SOC) of the vehicle battery and energy requirements of the electric vehicle.

BRIEF DESCRIPTION OF THE DRAWINGS

The above and other objects and advantages of the present disclosure will be apparent upon consideration of the following detailed description, taken in conjunction with the accompanying drawings, in which like reference characters refer to like parts throughout, and in which.

DETAILED DESCRIPTION

Figure 1:
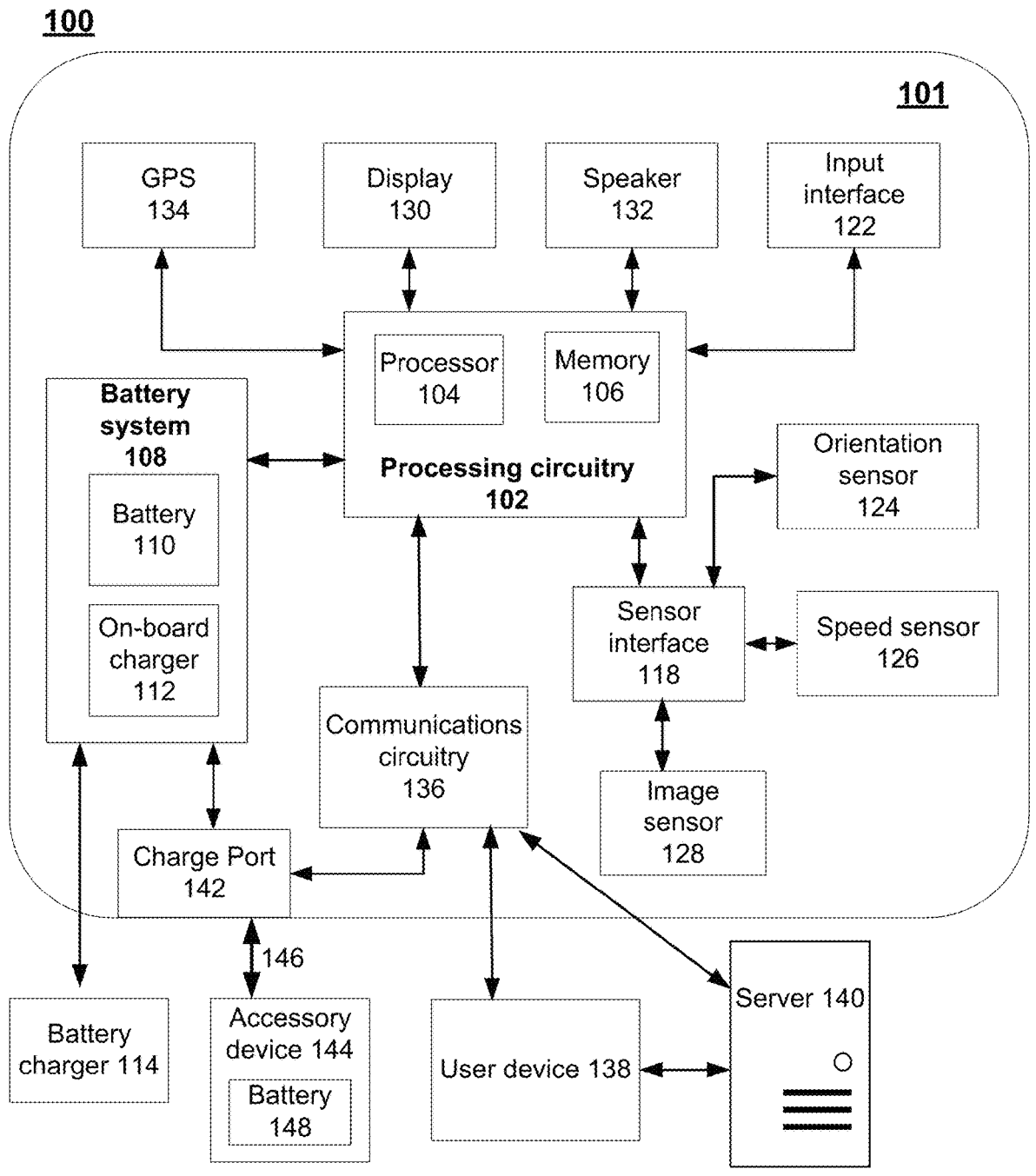
FIG. 1 shows a block diagram of components of a system of an electric vehicle for allocating charge from the electric vehicle to a connected accessory device (e.g., an E-bike), in accordance with some embodiments of the present disclosure.

FIG. 1 shows a block diagram of components of a system 100 of electric vehicle 101 for allocating charge from electric vehicle 101 to connected accessory device 144 (e.g., an E-bike), in accordance with some embodiments of the present disclosure. Electric vehicle 101 may be a car (e.g., a coupe, a sedan, a truck, an SUV, a bus), a motorcycle, an aircraft (e.g., a drone), a watercraft (e.g., a boat), or any other type of vehicle. Accessory device 144 may be an electric bike (E-bike), an electric surfboard, an electric scooter, an electric off-road vehicle (e.g., a quad), a portable heater or air-conditioner, a camping kitchen, or any other type of electronic device that a user of electric vehicle 101 may wish to charge by electric vehicle 101. As used herein, "electric bike" or "E-bike" may refer to an electric bicycle, an electric motorcycle, an electric moped, an electric dirt bike, etc. Although only a single accessory device 144 is shown, it should be understood that accessory device 144 may include a plurality of accessory devices (e.g., a plurality of E-bikes).

Electric vehicle 101 may comprise processing circuitry 102, which may comprise processor 104 and memory 106. Processor 104 may comprise a hardware processor, a software processor (e.g., a processor emulated using a virtual machine), or any combination thereof. In some embodiments, processor 104 and memory 106 in combination may be referred to as processing circuitry 102 of electric vehicle 101. In some embodiments, processor 104 alone may be referred to as processing circuitry 102 of electric vehicle 101. Memory 106 may comprise hardware elements for non-transitory storage of commands or instructions, that, when executed by processor 104, cause processor 104 to operate electric vehicle 101 in accordance with embodiments described above and below. Processing circuitry 102 may be communicatively connected to components of electric vehicle 101 via one or more wires, or via wireless connection.

Processing circuitry 102 may be communicatively connected to battery system 108, which may be configured to provide power to one or more of the components of electric vehicle 101 during operation. In some embodiments, electric vehicle 101 may be an electric vehicle or a hybrid electric vehicle. Battery system 108 may comprise battery 110, which may include one or more battery modules. In some embodiments, battery 110 may be a 180 kWh battery pack, a 135 kWh battery pack, a 100 kWh battery pack, or any other suitable size battery pack. Battery system 108 may further comprise on-board charger 112 to manage the flow of electricity to battery 110 (e.g., to perform AC-DC conversion when battery charger 114 is an AC charger), to manage the flow of electricity from battery 110 to accessory device 144 connected to charge port 142 (e.g., to perform DC-DC conversion to charge battery 148 of accessory device 144), and any other suitable components. Although only a single on-board charger 112 is described, it should be understood that on-board charger 112 may include multiple chargers or components for different purposes. For example, on-board charger 112 may include a first charger to charge battery 110 (e.g., from an external power source) and a second charger to charge battery 148 of accessory device 144 (e.g., by battery 110). In some embodiments, on-board charger 112 may include a separate charger for each charge port (e.g., charge port 142). In some embodiments, on-board charger 112 may include connectors for interfacing with battery charger 114. Battery system 108 may be configured to manage charging of battery 110, which may include measuring one or more characteristics of battery 110, identifying if a fault has occurred, providing power to components of electric vehicle 101, providing power to components connected to charge port 142 of electric vehicle 101, communicating with battery charger 114, any other suitable actions, or any combination thereof. Battery system 108 may include, for example, electrical components (e.g., switches, bus bars, resistors, capacitors), control circuitry (e.g., for controlling suitable electrical components), and measurement equipment (e.g., to measure voltage, current, impedance, frequency, temperature, or another parameter). Battery system 108 may provide charge status information to processing circuitry 102. Charge status information includes, for example, a current state of charge (SOC) or charge level, whether the battery is being charged, charging current, charging voltage, charging mode, and whether a charging fault exists.

In some embodiments, electric vehicle 101 may be plugged into, or otherwise connected to, battery charger 114 via a cable (e.g., having an SAE J1772 charging plug, a CCS connector, etc.), having more than one conductor of suitable gauge. Such cable may include conductors for carrying charging current and conductors for transmitting information. It will be understood that any suitable arrangement of leads may be used in accordance with the present disclosure.

Similarly, in some embodiments, accessory device 144 may be plugged into, or otherwise connected to, charge port 142 via cable 146 (e.g., having a USB-C connector, etc.), having more than one conductor of a suitable gauge. Such cable may include conductors for carrying charging current and conductors for carrying information (e.g., over a single cable). Accordingly, in some embodiments, as described in further detail below, when accessory device 144 is connected to charge port 142 via cable 146, data from accessory device 144 may be uploaded to electric vehicle 101 while accessory device 144 is charging. In some embodiments, charge port 142 is located outside of the cabin of electric vehicle 101 (e.g., in a truck bed of electric vehicle 101) so that accessory devices such as E-bikes may be charged while electric vehicle 101 is traveling. However, this is only an example, and charge port 142 may be located at any suitable location where accessory device 144 is likely to be charged (e.g., in a trunk or frunk of electric vehicle 101). Additionally, although only a single charge port 142 is shown, it should be understood that electric vehicle 101 may have any suitable number of charge ports 142.

In some embodiments, on-board charger 112 may be capable of charging battery 148 at one or more voltages, with one or more current limitations. For example, on-board charger 112 may receive information from accessory device 144 (e.g., via cable 146) indicating what voltage, current, or both, accessory device 144 may be charged with. On-board charger 112 may provide a charging current that is limited by one or more constraints. For example, accessory device 144 may communicate to on-board charger 112 what charging current is desired for charging, when accessory device 144 is connected to charge port 142. In some embodiments, one or more servers 140 or user device 138 may communicate to on-board charger 112 what charging current is desired for charging, based on an identifier of accessory device 144. For example, one or more servers 140 or user device 138 may provide a charging profile of accessory device 144, based on the identifier of accessory device 144. In a further example, a cable type may have a maximum associated current capacity based on insulation and heat transfer considerations.

Battery charger 114 may be coupled to a power source, e.g., a power transmission grid, a solar panel, a generator, a wind turbine, or another vehicle, and may be configured to provide charging current at a suitable charging voltage to battery 110 of electric vehicle 101. In some embodiments, battery charger 114 may correspond to a charger at a DC station (e.g., DC fast electric charging station) or AC station. Battery charger 114 may be, for example, a fixed charging station (e.g., a charging station installed in a public location or in a user's home), or a portable charger (e.g., a charger connected to a portable generator, a portable solar panel, or another vehicle). In some embodiments, battery charger 114 may be capable of charging battery 110 at one or more voltages, with one or more current limitations. For example, battery charger 114 may receive information from battery system 108 indicating what voltage, current, or both, electric vehicle 101 may be charged with. Battery charger 114 may provide a charging current that is limited by one or more constraints. For example, electric vehicle 101 may communicate to battery charger 114 what charging current is desired for charging. In a further example, a cable type may have a maximum associated current capacity based on insulation and heat transfer considerations. In some embodiments, battery charger 114 and on-board charger 112 support both the inflow and outflow of current from battery 110 via a coupling. For example, during vehicle-to-vehicle charging or vehicle-to-grid power supply, battery charger 114 and/or on-board charger 112 may direct power from battery 110 to a power source coupled to battery charger 114, such as a battery of another vehicle or an electric power grid.

Image sensor 128 (e.g., a camera) may be communicatively coupled to processing circuitry 102 (e.g., by way of sensor interface 118) and positioned at any suitable position in an interior or exterior of electric vehicle 101. In some embodiments, image sensor 128 may capture images of destinations traveled to by electric vehicle 101 to identify driving habits of electric vehicle 101. In some embodiments, image sensor 128 may capture images of occupants of vehicle 101 to determine which connected accessory device 144 to charge. Processing circuitry 102 may be communicatively connected to input interface 122 (e.g., a steering wheel, a touchscreen display, buttons, knobs, a microphone or other audio capture device, etc.). In some embodiments, a driver of electric vehicle 101 may be permitted to select certain settings in connection with the operation of electric vehicle 101 (e.g., input a range selection, etc.). In some embodiments, processing circuitry 102 may be communicatively connected to Global Positioning System (GPS) system 134 of electric vehicle 101, where the driver may interact with the GPS system via input interface 122. GPS system 134 may be in communication with multiple satellites to ascertain the vehicle's location and provide navigation directions to processing circuitry 102. As another example, the positioning device may operate on terrestrial signals, such as cell phone signals, Wi-Fi signals, or ultrawideband signals to determine a location of electric vehicle 101. The determined location may be in any suitable form such as a geographic coordinate, a street address, a nearby landmark such as an identification of the nearest charging station or a tagged location associated with the vehicle (e.g., a location of a home of the user stored in memory 106). In some embodiments, processing circuitry 102 uses the determined location to identify whether electric vehicle 101 is within a threshold range of a tagged location (e.g., is within a certain range of a charging station or is within a certain range of an adventure waypoint). A waypoint may be a point of reference that can be used for location and navigation and that may be set as a stop on a route (e.g., to an endpoint). In some embodiments, battery system 108 may utilize the determined location to identify whether battery charger 114 is a home charging station or a non-home charging station (e.g., a public charging station, another vehicle, a generator, etc.).

Processing circuitry 102 may be communicatively connected to display 130 and speaker 132. Display 130 may be located at a dashboard of electric vehicle 101 and/or a heads-up display at a windshield of electric vehicle 101. For example, an interface for GPS system 134 or an interface of an infotainment system may be generated for display, and display 130 may comprise an LCD display, an OLED display, an LED display, or any other type of display. In some embodiments, display 130 may provide a driver with range information; estimated charge time information of electric vehicle 101 based on information output by battery system 108; or estimated charge time information of accessory device 144 connected to charge port 142, based on information from accessory device 144 and/or by battery system 108. Speaker 132 may be located at any location within the cabin of electric vehicle 101, e.g., at the dashboard of electric vehicle 101, on an interior portion of the vehicle door. In some embodiments, speaker 132 may be configured to provide audio alerts related to charging range information, accessory device charging information, and estimated charge time information based on information output by battery system 108 and/or by accessory device 144.

Processing circuitry 102 may be communicatively connected (e.g., by way of sensor interface 118) to orientation sensor 124, which may be an inclinometer, an accelerometer, a tiltmeter, any other pitch sensor, or any combination thereof and may be configured to provide vehicle orientation values (e.g., vehicle's pitch and/or vehicle's roll) to processing circuitry 102. Speed sensor 126 may be one of a speedometer, a GPS sensor, or the like, or any combination thereof, and may be configured to provide a reading of the vehicle's current speed to processing circuitry 102.

In some embodiments, processing circuitry 102 may be in communication (e.g., via communications circuitry 136) with user device 138 (e.g., a mobile device, a computer, a key fob, etc.). Such connection may be wired or wireless. In some embodiments, user device 138 may execute instructions stored in memory to run a map interface application, e.g., to provide information related to electric charging stations for charging electric vehicle 101, to provide information related to adventure waypoints (e.g., points of interest) related to accessory device 144 connected to charge port 142 (e.g., bike trails when an E-bike is connected to charge port 142), to provide any other suitable information related to a multimodal trip, or to perform any of the functions described above and below. In some embodiments, communications circuitry and/or user device 138 may be in communication with one or more servers 140 (e.g., over a communications network such as, for example, the Internet), which may be configured to provide information related to electric charging stations, adventure waypoints, and/or mapping or GPS information to electric vehicle 101 and/or user device 138, and provide an updated display based on user inputs.

It should be appreciated that FIG. 1 only shows some of the components of electric vehicle 101, and it will be understood that electric vehicle 101 also includes other elements commonly found in vehicles (e.g., electric vehicles), e.g., a motor, brakes, wheels, wheel controls, turn signals, windows, doors, etc.

Figure 2:
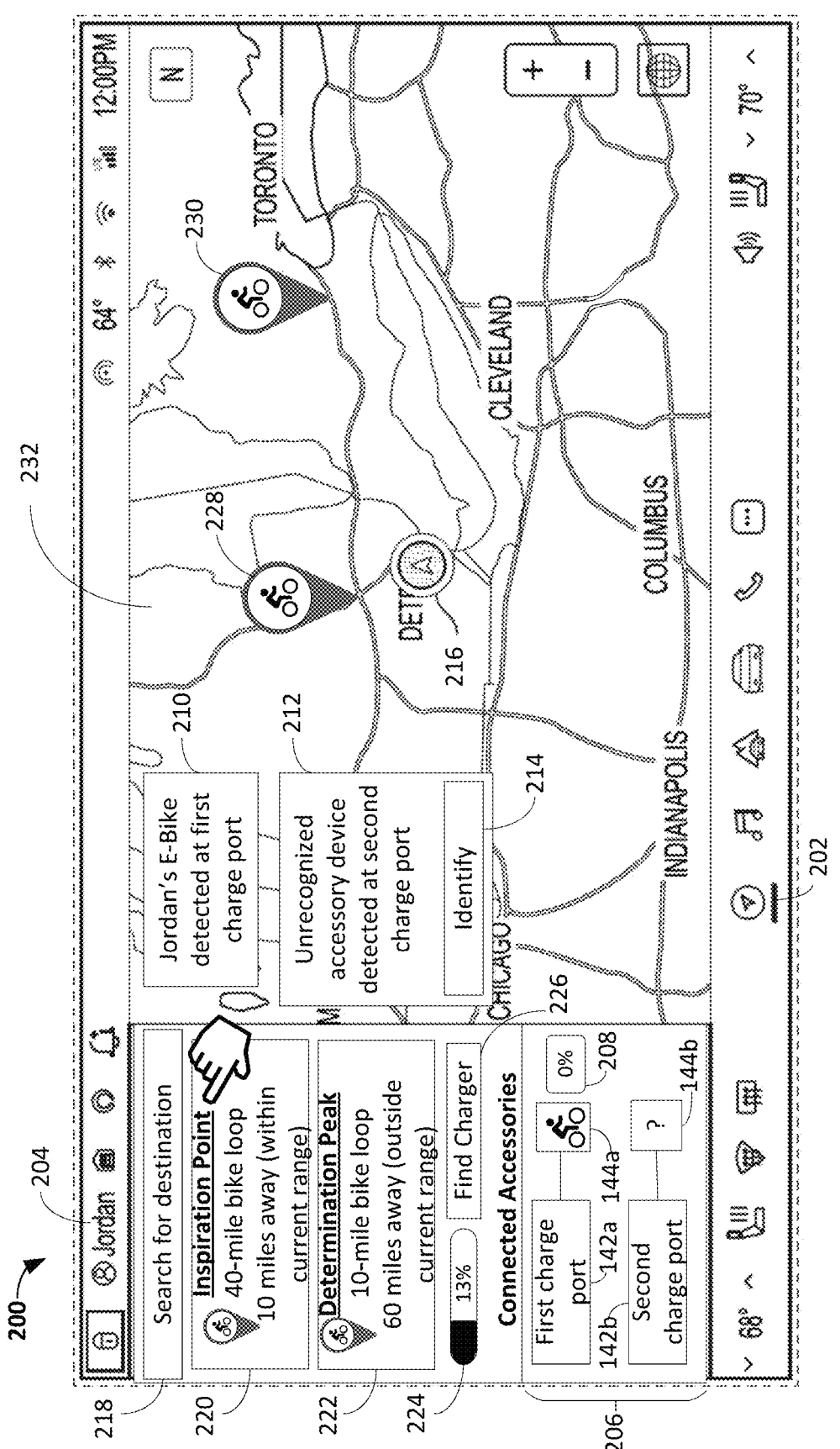
FIG. 2 shows an exemplary navigation interface for managing connected accessory devices and for identifying desired points of interest (e.g., adventure waypoints), in accordance with some embodiments of the present disclosure.

FIG. 2 shows an exemplary navigation interface 200 for managing connected accessory devices and for identifying desired points of interest (e.g., adventure waypoints), in accordance with some embodiments of the present disclosure. As reflected in connected accessory graphic 206, navigation interface 200 corresponds to an example in which electric vehicle 101 includes first charge port 142a and second charge port 142b, and first accessory device 144a is connected to first charge port 142a and second accessory device 144b is connected to second charge port 142b. However, this is only one example, and electric vehicle 101 may have any suitable number of charge ports and connected accessory devices (e.g., charge port 142 and accessory device 144 of FIG. 1), as described above. Navigation interface 200 may be generated for display, by way of processing circuitry 102, at an in-vehicle infotainment screen of display 130 (e.g., a heads-up display and/or one or more dashboard displays depicting graphical user interfaces) and/or at a display of user device 138 of an occupant of electric vehicle 101 (e.g., driver 204). In some embodiments, navigation interface 200 may be displayed in response to receiving a selection of icon 202 from a different interface screen, when an accessory device (e.g., first accessory device 144a or second accessory device 144b) is connected or identified, when a charging destination is suggested to or selected by a user, or at any other suitable time when a user (e.g., driver 204) may be interested in stopping at a point of interest (e.g., related to a type of the connected accessory device).

When an accessory device (e.g., first accessory device 144a or second accessory device 144b) is connected (e.g., through a single cable for transferring power and data) to a charge port of electric vehicle 101 (e.g., first charge port 142a or second charge port 142b), processing circuitry 102 detects the accessory device and attempts to recognize the accessory device based on information retrieved from the accessory device (e.g., over cable 146). For example, when first accessory device 144a is connected to first charge port 142a, processing circuitry 102 recognizes first accessory device 144a as an E-bike (e.g., the type of first accessory device 144a) that was previously associated with an account of driver 204 (e.g., when first accessory device 144a was first connected to electric vehicle 101). For example, processing circuitry 102 compares a retrieved identifier of first accessory device 144a with identifiers stored in user profiles associated with electric vehicle 101. In some embodiments, processing circuitry 102 retrieves other information from first accessory device 144a such as a current SOC of first accessory device 144a (e.g., current SOC 208) and ride data (e.g., previous rides, average speed, elevation, etc.), and saves this information to the associated user profile. For example, electric vehicle 101 may upload this information to a cloud-based user profile (e.g., by one or more servers 140). As shown, navigation interface 200 may display connected accessories graphic 206, including icons indicating first accessory device 144a connected to first charge port 142a and current SOC 208 (e.g., 0% charged). In some embodiments, Navigation interface 200 may also display notification 210 indicating that "Jordan's E-bike detected at first charge port." Additionally, because first accessory device 144a is connected to first charge port 142a by a cable that transmits data and power, processing circuitry 102 may be able to retrieve information from first accessory device 144a, even if the battery of the first accessory device 144a is dead (e.g., the current SOC is 0%).

Search bar 218 may be selected by an occupant of the vehicle (e.g., driver 204) to toggle a keyboard (e.g., similar to keyboard 302 of FIG. 3) for entering a destination. In some embodiments, an occupant of the vehicle may search for a destination using a voice input. In some embodiments, processing circuitry 102 may automatically identify points of interest (e.g., adventure waypoints) based on the type of detected accessory device and suggest the identified points of interest on navigation interface 200. For example, in response to determining that first accessory device 144a is an E-bike, processing circuitry 102 may identify nearby bike trails (e.g., based on the current location of electric vehicle 101, as shown by indicator 216 on map portion 232 on navigation interface 200). For example, processing circuitry 102 may search a stored map or submit a request to one or more servers 140. Navigation interface 200 may present icons corresponding to the identified bike trails that are selectable by a user to set as a desired destination. For example, navigation interface 200 may present icon 220 for "Inspiration Point," a 40-mile bike loop that is ten miles away from the current location of electric vehicle 101, and icon 222 for "Determination Peak," a 10-mile bike loop that is 60 miles away from the current location of electric vehicle 101. In some embodiments, processing circuitry 102 may determine if each of the identified points of interest are within the current range of electric vehicle 101 (e.g., based on the current SOC of electric vehicle 101) and include this information in the displayed icon. Processing circuitry 102 may estimate the current range of electric vehicle 101 based on the current SOC of electric vehicle 101 (e.g., "13%" as displayed in current SOC icon 224). Navigation interface 200 may display an indicator on map portion 232 for each of the identified points of interest (e.g., icon 228 for the trailhead of "Inspiration Point" and icon 230 for the trailhead of "Determination Peak"). In response to a user selection of a point of interest, processing circuitry 102 determines a route to a charger (e.g., the endpoint) and sets the point of interest as a waypoint (e.g., an adventure waypoint), as explained in further detail below with reference to FIG. 4.

In some embodiments, processing circuitry 102 may only search for points of interest that are within the current range of electric vehicle 101. That is, processing circuitry 102 may only search for points of interest that electric vehicle 101 may reach while still having sufficient charge to reach a charger after stopping at the point of interest (e.g., a waypoint). In some embodiments, processing circuitry 102 may first set a charger as a destination (e.g., automatically based on the current SOC of electric vehicle 101 or in response to a user selection of find charger icon 226) and only search for points of interest that are along the determined route to the charger.

When second accessory device 144b is connected to second charge port 142b, processing circuitry 102 detects second accessory device 144b and attempts to recognize accessory device 144b based on information retrieved from second accessory device 144b (e.g., by cable 146). However, if second accessory device 144b has not been previously connected to electric vehicle 101 or registered to a user profile associated with electric vehicle 101, processing circuitry 102 may not be able to recognize second accessory device 144b. In this case, processing circuitry 102 may submit a query to one or more servers 140 requesting information of second accessory device 144b (e.g., type, make, model, etc.). In some embodiments, navigation interface 200 may display notification 212 indicating that "Unrecognized accessory device detected at second charge port." Navigation interface 200 may further display prompt 214 (e.g., "Identify") that is selectable by a user to identify the unrecognized device. In response to a user selection of prompt 214, search interface 300 may be generated for display, by way of processing circuitry 102, at an in-vehicle infotainment screen of display 130 (e.g., at a heads-up display and/or at one or more dashboard displays depicting graphical user interfaces) and/or at a display of user device 138 of driver 204 of electric vehicle 101, as shown in FIG. 3.

Figure 3:
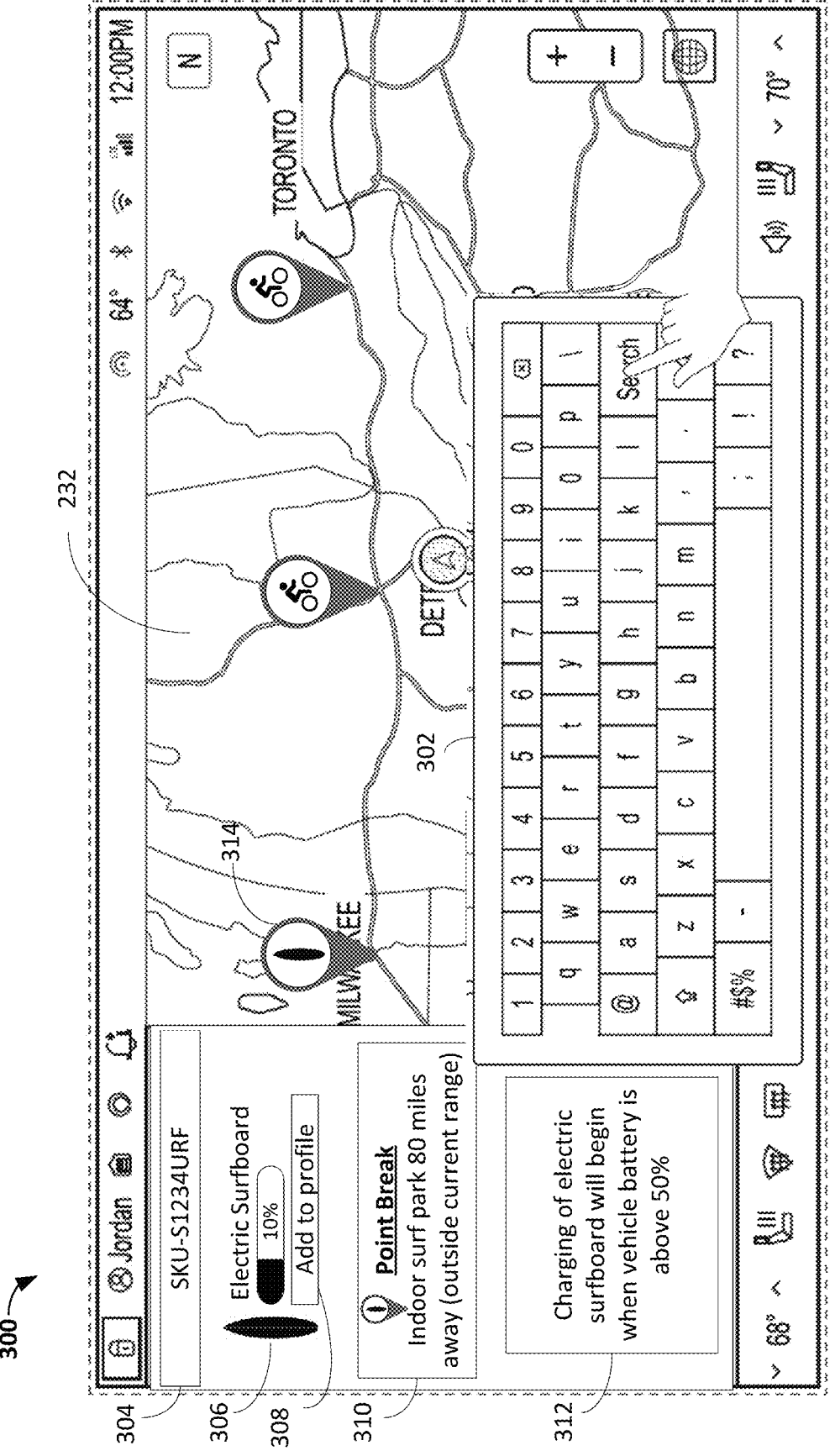
FIG. 3 shows an exemplary search interface for identifying an unrecognized accessory device connected to a charge port of the electric vehicle, in accordance with some embodiments of the present disclosure.

FIG. 3 shows an exemplary search interface 300 for identifying an unrecognized accessory device (e.g., second accessory device 144b) connected to a charge port of electric vehicle 101, in accordance with some embodiments of the present disclosure. As shown, a user may enter identifying information 304 (e.g., an SKU, UPC, model number, make/model, etc.) of second accessory device 144b in search bar 218 (e.g., SKU "S1234URF"), using displayed keyboard 302. However, this is only one example, and a user may enter identifying information 304 of second accessory device 144b in any other suitable manner (e.g., by scanning a barcode of second accessory device 144b with user device 138, by uploading a picture of second accessory device 144b, etc.). In response to the search input, processing circuitry 102 may identify second accessory device 144b as an "electric surfboard," as indicated by icon 306 on search interface 300. Icon 306 may display other retrieved information (e.g., from one or more servers 140) of second accessory device 144b such as the current SOC and capacity of the battery of second accessory device 144b (e.g., "10%"). Additionally, in some embodiments, search interface 300 may present an option to add a recognized accessory device to a user profile. For example, search interface 300 may display option 308 (e.g., "Add to profile") to add second accessory device 144b to a user profile (e.g., of driver 204). Thus, in some embodiments, every subsequent time second accessory device 144b is connected to any charge port of electric vehicle 101, information (e.g., previous surf sessions, etc.) may be automatically uploaded to the user profile so the user may view the information at any screen capable of accessing the user profile (e.g., vehicle infotainment screen of display 130, the display of user device 138, etc.). In some embodiments, processing circuitry 102 may automatically create a temporary user profile and assign second accessory device 144b to the temporary user profile.

In some embodiments, as similarly described above with reference to FIG. 2, in response to recognizing second accessory device 144b, processing circuitry 102 may automatically identify points of interest (e.g., adventure waypoints) based on the type of detected accessory device and suggest the identified points of interest. For example, in response to determining that second accessory device 144b is an electric surfboard ("E-surfboard"), processing circuitry 102 may identify, based on the current location of electric vehicle 101, nearby surf spots (e.g., natural and artificial surf spots). Processing circuitry 102 may update map portion 232 to also include icons (e.g., icon 310 for "Point Break") corresponding to identified surf spots that are selectable by a user as a desired destination. For example, navigation interface 200 or search interface 300 may update map portion 232 to also present icon 314 for "Point Break," an indoor surf park 80 miles away from the current location of electric vehicle 101. As discussed above, processing circuitry 102 may determine that "Point Break" is not within the current range of electric vehicle 101 and include this information on the displayed icon. Additionally, because the current SOC of electric vehicle 101 is low and because electric vehicle 101 will need to stop and charge electric vehicle 101 to reach "Point Break," processing circuitry 102 may schedule charging of second accessory device 144b and display notification 312 indicating that second accessory device 144b is not being charged, but is scheduled to be charged when certain conditions are met (e.g., "charging of electric surfboard will begin when vehicle battery is above 50%").

In some embodiments, if the user selects "Point Break" as a destination, processing circuitry 102 may set a charger as a waypoint to "Point Break," and determine if second accessory device 144b is able to be charged on the route to the charger waypoint. For example, because second accessory device 144b may take a significant amount of time to charge to a suitable level, processing circuitry 102 may allocate charge to second accessory device 144b and begin charging second accessory device 144b as soon as possible if electric vehicle 101 is able to reach the charger waypoint based on the current SOC (e.g., so a user does not have to wait at "Point Break" for second accessory device 144b to charge to a desired level). Otherwise, in order to preserve charge of electric vehicle 101, processing circuitry 102 may wait to charge second accessory device 144b until electric vehicle 101 reaches the charger waypoint. In some embodiments, if the user associated with the user profile associated with second accessory device 144b is not currently present in electric vehicle 101, processing circuitry 102 may not allocate charge to second accessory device 144b unless requested by a user (e.g., in response to a prompt). That is, processing circuitry 102 may determine if second accessory device 144b is likely to be used at the point of interest. Once a point of interest is selected by a user, processing circuitry 102 generates a route and allocates charge to one or more connected accessory devices, as explained in further detail below with reference to FIG. 4. For example, in response to a user selecting icon 220 (of FIG. 2) to navigate to "Inspiration Point," processing circuitry 102 may determine a route and allocate charge to one or more connected accessory devices, as explained in further detail below with reference to FIG. 4.

Figure 4:
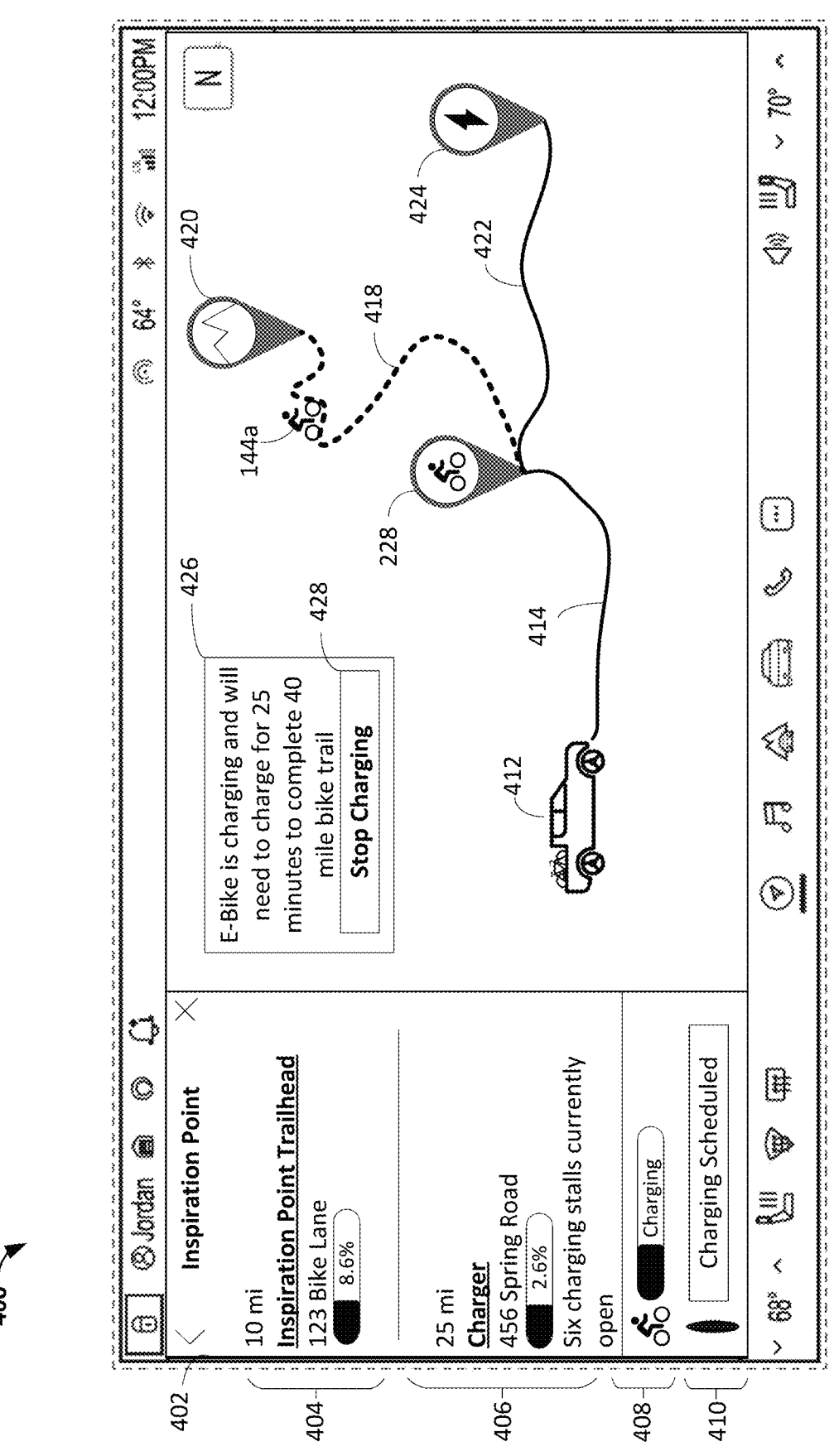
FIG. 4 shows an exemplary navigation interface for navigating to a charging destination with a stop at an adventure waypoint, in accordance with some embodiments of the present disclosure.

FIG. 4 shows an exemplary navigation interface 400 for navigating to a charging destination (e.g., an endpoint indicated by icon 424) with a stop at icon 420 for "Inspiration Point," in accordance with some embodiments of the present disclosure. Navigation interface 400 may be generated for display in response to a user selecting icon 220 for "Inspiration Point" on navigation interface 200. Based on the current SOC of electric vehicle 101 (e.g., 13%), processing circuitry 102 may identify a charger within the current range of electric vehicle 101 (e.g., icon 424 for the identified charger), set the charger as the destination, set the Inspiration Point trailhead as a waypoint (e.g., an adventure waypoint), and determine a route to the charger with a stop at the adventure waypoint. As shown, navigation interface 400 may display the suggested route, which includes first vehicle route portion 414 from icon 412 of the current location of electric vehicle 101 to icon 228 for the Inspiration Point trailhead and second vehicle route portion 422 from icon 228 to icon 424 for the identified charger. In some embodiments, if a charger is available at the desired point of interest (e.g., the Inspiration Point trailhead), the suggested route may only include first vehicle route portion 414.

Processing circuitry 102 may estimate the energy requirements of electric vehicle 101 to travel along the suggested route. For example, processing circuitry 102 may retrieve route details of the suggested vehicle route from one or more servers 140 to estimate the energy requirements of electric vehicle 101, based on the efficiency of electric vehicle 101. Although the term "energy requirements" is used herein, it should be understood that "energy requirements" may refer to a single requirement (e.g., the energy required to reach a destination) or multiple energy requirements. The route information may include distance information, weather information, terrain data (e.g., from a mapping provider or trail provider), speed limit information, traffic information, historical driving efficiency data, or any other suitable information about factors that may affect the range of electric vehicle 101. Processing circuitry 102 may also analyze the driving habits of the driver of electric vehicle 101 (e.g., driver 204) to estimate the energy requirements of electric vehicle 101. In some embodiments, when estimating the energy requirements of electric vehicle 101, processing circuitry 102 may predict energy that may be used by electric vehicle 101 at the desired point of interest. For example, in some embodiments, the user of electric vehicle 101 may plan to spend the day/night at the point of interest after completing the bike ride. In this case, processing circuitry 102 may predict energy used by different systems of electric vehicle 101 (e.g., the infotainment system, the heating/cooling system, etc.). In some embodiments, processing circuitry 102 may analyze past behavior by the driver or prompt the driver to indicate if they plan to stay at the point of interest or use any energy at the point of interest. For example, in the illustrated embodiment, processing circuitry 102 may estimate that it will require 4 kWh for electric vehicle 101 to travel along first vehicle route portion 414 (e.g., an average of 0.4 kWh/mi for ten miles), and 6 kWh for electric vehicle 101 to travel along second vehicle route portion 422 (e.g., an average of 0.4 kWh/mi for 15 miles). Processing circuitry 102 may estimate that no significant energy consumption will occur while electric vehicle 101 is parked at the Inspiration Point trailhead.

Processing circuitry 102 may estimate the energy requirements of first accessory device 144a (e.g., E-bike) at the desired point of interest. For example, processing circuitry 102 may retrieve bike route details from one or more servers 140 to estimate the energy requirement of first accessory device 144a, based on the efficiency of first accessory device 144a and historical biking efficiency of the rider of first accessory device 144a (e.g., retrieved in the associated user profile). The route information may include distance information, weather information, terrain data (e.g., from a mapping provider or trail provider), or any other suitable information about factors that may affect the range/efficiency of first accessory device 144a. For example, in the illustrated embodiment, processing circuitry 102 may estimate that it will require 0.4 kWh for first accessory device 144a to travel along bike route 418 (e.g., a loop from icon 228 for the Inspiration Point trailhead to icon 420 for Inspiration Point and back to icon 228). Based on the estimated energy requirements of electric vehicle 101 and the estimated energy requirements of first accessory device 144a (0.4 kWh), processing circuitry 102 may determine that charge may be allocated from electric vehicle 101 to first accessory device 144a, while electric vehicle 101 is traveling to the Inspiration Point trailhead, and automatically start charging first accessory device 144a (e.g., without requiring input from the user). For example, for simplicity, assuming the capacity of the battery (e.g., battery 110) of electric vehicle 101 is 100 kWh and the battery (e.g., battery 148) of first accessory device 144a is 1 kWh, processing circuitry 102 may estimate that the energy required to travel along the suggested route to the charger and charge first accessory device 144a from 0% (e.g., the current SOC of first accessory device 144a) to 40% (e.g., the 0.4 kWh required for the bike trip) will reduce the current SOC of the battery of electric vehicle 101 from 13% to 2.6%

As shown, navigation interface 400 may display notification 426 informing the user that the connected E-bike (first accessory device 144a) is charging. In some embodiments, notification 426 may also inform the user how long the E-bike must charge to have sufficient capacity to complete the bike trip ("E-bike is charging and will need to charge for 25 minutes to complete 40-mile bike trail"). In some embodiments, navigation interface 400 may also display prompt 428 to allow the user to stop charging of the connected E-bike. For example, the user may decide they do not want to complete the entire bike trip. In this case, once charging is stopped, processing circuitry 102 may estimate the range of the E-bike based on the current SOC of the E-bike. In some embodiments, if the E-bike is not fully charged when electric vehicle 101 reaches the Inspiration Point trailhead, electric vehicle 101 may continue to charge the E-bike, even after electric vehicle 101 is turned off (e.g., the user exits electric vehicle 101 to change into cycling gear). For example, battery system 108 may be prevented from entering a sleep mode until the E-bike is fully charged.

In some embodiments, navigation interface 400 may display navigation window 402 including information about the suggested route. For example, as shown, navigation window 402 may include graphic 404 indicating the current distance to the Inspiration Point trailhead, the address of the Trailhead, and the estimated vehicle battery level when electric vehicle 101 reaches the Trailhead. Navigation window 402 may also include graphic 406 indicating the current distance to the charging destination, the address of the charging destination, and the number of available chargers at the charging destination. However, this is only an example, and navigation window 402 may include any suitable route information.

In some embodiments, navigation interface 400 may display icon 408 showing that the E-bike (first accessory device 144*a*) is currently charging, and icon 410 showing that the E-surfboard is not currently being charged, but is scheduled for charging (e.g., as described above in FIG. 3).

Although only a single accessory device is described as being charged with reference to FIG. 4 (e.g., first accessory device 144*a*), it should be understood that the charge allocation described above may be used for any number of accessory devices. For example, if four E-bikes are connected to charging ports of electric vehicle 101, processing circuitry 102 may determine that charge could be allowed to each of the E-bikes, while still leaving sufficient vehicle battery capacity to reach the charging destination (e.g., by estimating that another 2 kWh would be required to charge the other three E-bikes). Additionally, in some embodiments, if electric vehicle 101 is currently charging (e.g., at the current location indicated by icon 412), processing circuitry 102 may determine how much longer electric vehicle 101 should continue charging to be able to charge accessory devices and reach the charging destination indicated by icon 424 after stopping at the trailhead indicated by icon 228. Thus, if a user does have to stop to charge electric vehicle 101 before reaching a desired point of interest, charging time at the charging stop may be minimized (e.g., by only charging the vehicle battery to the capacity required to reach the next charging destination and charge the connected accessory devices predicted to be used at the adventure waypoint).

Figure 5:
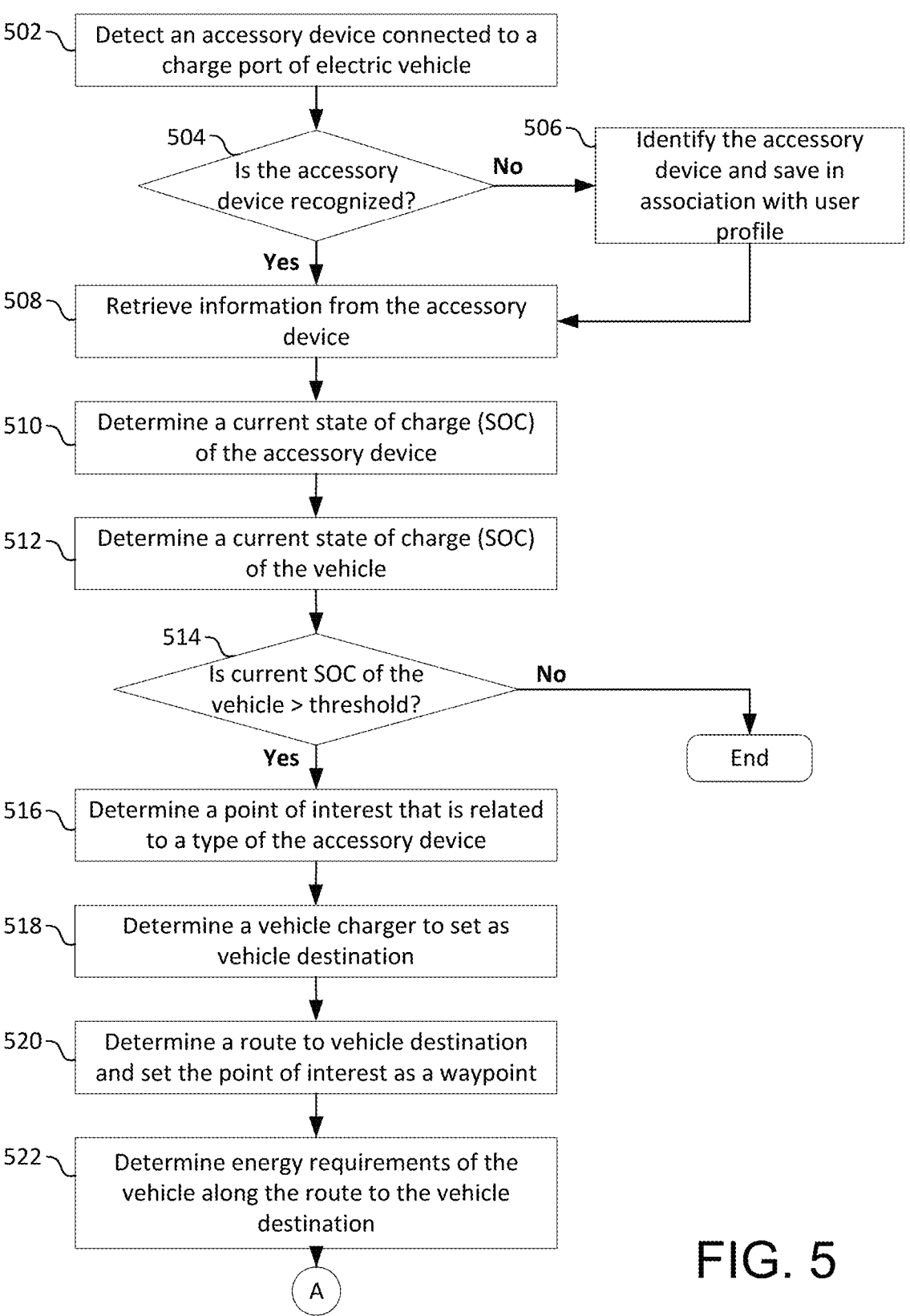
FIG. 5 shows a flowchart of an illustrative process for allocating charge to an accessory device connected to a charge port of the electric vehicle, in accordance with some embodiments of the present disclosure.

FIG. 5 shows a flowchart of an illustrative process 500 for allocating charge to an accessory device connected to a charge port of electric vehicle 101, in accordance with some embodiments of the present disclosure. Process 500 may be performed at least in part by processing circuitry 102.

At 502, processing circuitry 102 detects an accessory device connected to a charge port of electric vehicle 101. As discussed above, electric vehicle 101 may include a plurality of charge ports so that a plurality of accessory devices may be simultaneously connected to and charged by electric vehicle 101. As discussed above, the connection between the accessory devices and the charge ports (e.g., a cable) may provide for both power and data transmission between electric vehicle 101 and the accessory devices. In some embodiments, the charge ports of electric vehicle 101 may be external charge ports (e.g., located in the truck bed of a vehicle, or the trunk or frunk of a vehicle). For example, as described above, processing circuitry 102 may detect an E-bike connected to a charge port in a truck bed of electric vehicle 101.

At 504, processing circuitry 102 determines if the detected accessory device is recognized. For example, if the detected accessory device has not been previously connected to electric vehicle 101, processing circuitry 102 may not be able to identify the detected accessory device or determine a user profile to associate with the detected accessory device. In response to not recognizing the detected accessory device ("No" at 504), processing may proceed to 506. Otherwise ("Yes" at 504), processing may proceed to 508.

At 506, processing circuitry 102 identifies the connected accessory device and saves the accessory device in association with a user profile. For example, as explained above with reference to FIG. 3, processing circuitry 102 may prompt a user to enter identifying information of the accessory device (e.g., an SKU, UPC, model number, make/model, etc.) and a user profile to associate with the accessory device. In some embodiments, processing circuitry 102 may retrieve other information of the accessory device based on the entered identification information (e.g., by submitting a request to one or more servers). In some embodiments, if a desired user profile is not available (e.g., the user of the accessory device has not yet created a user profile), processing circuitry 102 may generate a profile for the user or assign the accessory device to a temporary profile.

At 508, processing circuitry 102 retrieves information from the identified accessory device. For example, processing circuitry 102 may retrieve information logged by the identified accessory device since the last time the accessory device was connected with electric vehicle 101 or uploaded to a user profile. For example, if the identified accessory device is an E-bike (e.g., first accessory device 144*a*), processing circuitry 102 may retrieve information of previous bike trips of the E-bike. In some embodiments, processing circuitry 102 may save this information to the user's profile. For example, processing circuitry 102 may upload this information to the user's cloud-based profile.

At 510, processing circuitry 102 may determine the current SOC of the accessory device (e.g., of the battery of the accessory device).

At 512, processing circuitry 102 may determine the current SOC of electric vehicle 101 (e.g., of the battery of electric vehicle 101).

At 514, processing circuitry 102 may determine if the current SOC of electric vehicle 101 is greater than a low charge threshold (e.g., 5% capacity). In response to determining that the current SOC of electric vehicle 101 is not greater than the low charge threshold, processing may end. That is, processing circuitry 102 may determine to not allocate any charge to the connected accessory device until electric vehicle 101 is recharged. In some embodiments, the low charge threshold may be adjusted based on user preferences or available chargers. In response to determining that the current SOC of electric vehicle 101 is greater than the low charge threshold, processing may proceed to 516.

At 516, processing circuitry 102 determines a point of interest that is related to the type of the accessory device. For example, if the accessory device is an E-bike, processing circuitry 102 may identify nearby bike trails, present the identified bike trails as suggestions to a user, and receive a selection of one of the suggestions as the desired point of interest. Similarly, if the accessory device is an E-surfboard, processing circuitry 102 may identify nearby surf spots. In some embodiments, a user may search for a desired point of interest (e.g., using navigation interface 200).

At 518, processing circuitry 102 determines a vehicle charger to set as a vehicle destination. For example, processing circuitry 102 determines a vehicle charger along a route electric vehicle 101 is already traveling, receives a selection of a vehicle charger by a user, or identifies a vehicle charger in the proximity of the desired point of interest. In some embodiments, processing circuitry 102 first determines the vehicle charger before searching for desired points of interest, in order to suggest points of interest along a route to the vehicle charger.

At 520, processing circuitry 102 determines a route to the vehicle destination (e.g., the determined vehicle charger) and sets the determined point of interest as a waypoint (e.g., an adventure waypoint).

At 522, processing circuitry 102 determines energy requirements of electric vehicle 101 along the determined route to the vehicle destination. For example, as described above with reference to FIG. 4, processing circuitry 102 may retrieve route information from one or more servers 140 to estimate the energy required to travel along the route, based on vehicle information, driving habits, and any other suitable information. In some embodiments, processing circuitry 102 may also determine energy requirements of electric vehicle 101 when electric vehicle 101 is stopped at the point of interest.

At 524, processing circuitry 102 determines energy requirements of the accessory device at the point of interest. For example, processing circuitry 102 estimates the energy required for the E-bike to travel along a bike path at the point of interest. For example, as described above with reference to FIG. 4, processing circuitry 102 may retrieve bike path information from one or more servers 140 to estimate the energy required to travel along the bike path, based on E-bike information, biking habits of the user, and any other suitable information.

At 526, processing circuitry 102 allocates charge from electric vehicle 101 to the accessory device based on the current SOC of the vehicle, the energy requirements of the vehicle, the current SOC of the accessory device, and the energy requirements of the accessory device. For example, processing circuitry 102 determines how much charge can be allocated to the accessory device, without depleting the vehicle battery beyond a level required to reach the charging station.

At 528, processing circuitry 102 transfers, by the charge port, the allocated charge from electric vehicle 101 to the accessory device. For example, in response to determining that charge is able to be allocated to the accessory device, processing circuitry 102 may control battery system 108 to immediately begin charging the accessory device, without requiring an input from the user. In some embodiments, processing circuitry 102 may prompt the user to start or stop charging of the accessory device.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. For example, in some embodiments, step 516 may be performed after a vehicle charger is determined as the vehicle destination in step 518. In some embodiments, in step 526, charge may be allocated based only on the energy requirements of electric vehicle 101 and the current SOC of electric vehicle 101. For example, once it is determined that the current SOC of electric vehicle 101 is sufficient to allocate charge to a connected accessory device, electric vehicle 101 may continue to charge the accessory device until the accessory device is fully charged or the allocated charge level is reached.

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations thereto and modifications thereof, which are within the spirit of the following claims.

What is claimed is:

1. A vehicle comprising:

a charge port coupled to a vehicle battery and configured to connect to an accessory device; and processing circuitry configured to:

determine an adventure waypoint;

determine energy requirements of the accessory device by estimating energy to be used by the accessory device at the adventure waypoint; and allocate charge from the vehicle battery to the accessory device based on a current state of charge (SOC) of the vehicle battery and the energy requirements of the accessory device.

2. The vehicle of claim 1, wherein the processing circuitry is configured to allocate charge from the vehicle battery to the accessory device further based on a current SOC of an accessory battery of the accessory device.

3. The vehicle of claim 2, wherein the charge port is configured to:

transfer the allocated charge from the vehicle battery to the accessory device; and retrieve data from the accessory device, wherein the retrieved data comprises the current SOC of the accessory battery.

4. The vehicle of claim 2, wherein the charge port is configured to:

transfer the allocated charge from the vehicle battery to the accessory device by a cable connecting the charge port to the accessory device; and retrieve data from the accessory device by the cable.

5. The vehicle of claim 1, wherein the processing circuitry is further configured to:

retrieve an identifier from the accessory device connected to the charge port;

determine, based on the identifier, a type of the accessory device;

determine a current location of the vehicle; and determine the adventure waypoint based on the type of the accessory device and the current location of the vehicle.

6. The vehicle of claim 5, wherein the type of the accessory device is an electric bike, and wherein the processing circuitry is configured to determine the energy requirements of the accessory device by:

identifying a bike route for the electric bike at the adventure waypoint; and determining energy required to travel along the bike route, based on route information of the bike route.

7. The vehicle of claim 1, wherein the processing circuitry is further configured to receive a user selection of the adventure waypoint.

8. The vehicle of claim 1, wherein the adventure waypoint is selected from among a plurality of adventure waypoints based on the current SOC of the vehicle battery and energy requirements of the vehicle.

9. The vehicle of claim 1, wherein the processing circuitry is further configured to:

determine an endpoint associated with a first charging station;

determine energy requirements of the vehicle to travel along a route to the endpoint with a stop at the adventure waypoint;

determine whether the current SOC of the vehicle battery is sufficient to meet the determined energy requirements of the vehicle;

in response to a determination that the current SOC of the vehicle battery is not sufficient to meet the determined energy requirements of the vehicle, determine whether a charging waypoint associated with a second charging station is available along the route to the adventure waypoint;

17 in response to a determination that the charging waypoint is available along the route, control the charge port to transfer the allocated charge from the vehicle battery to the accessory device; and in response to a determination that the charging waypoint is not available along the route, allocate zero charge to the accessory device.

10. A method comprising:

detecting an accessory device coupled to a charge port of a vehicle, wherein the charge port is coupled to a vehicle battery of the vehicle;

determining an adventure waypoint;

determining energy requirements of the accessory device by estimating energy to be used by the accessory device at the adventure waypoint; and allocating charge from the vehicle battery to the accessory device based on a current state of charge (SOC) of the vehicle battery and the energy requirements of the accessory device.

11. The method of claim 10, wherein the allocating charge from the vehicle battery to the accessory device is further based on a current SOC of an accessory battery of the accessory device.

12. The method of claim 11, further comprising:

transferring, by the charge port, the allocated charge from the vehicle battery to the accessory device; and retrieving, by the charge port, data from the accessory device, wherein the retrieved data comprises the current SOC of the accessory battery.

13. The method of claim 11, further comprising:

transferring, by a cable connecting the charge port to the accessory device, the allocated charge from the vehicle battery to the accessory device; and retrieving, by the cable, data from the accessory device.

14. The method of claim 10, further comprising:

retrieving an identifier from the accessory device connected to the charge port;

determining, based on the identifier, a type of the accessory device;

determining a current location of the vehicle; and determining the adventure waypoint based on the type of the accessory device and the current location of the vehicle.

15. The method of claim 10, further comprising receiving a user selection of the adventure waypoint.

16. The method of claim 10, wherein the adventure waypoint is selected from among a plurality of adventure waypoints based on the current SOC of the vehicle battery, energy requirements of the vehicle, and a type of the accessory device.

17. The method of claim 10, further comprising:

determining an endpoint associated with a first charging station;

determining energy requirements of the vehicle to travel along a route to the endpoint with a stop at the adventure waypoint;

determining whether the current SOC of the vehicle battery is sufficient to meet the determined energy requirements of the vehicle;

in response to a determination that the current SOC of the vehicle battery is not sufficient to meet the determined energy requirements of the vehicle, determining whether a charging waypoint associated with a second charging station is available along the route to the adventure waypoint;

in response to a determination that the charging waypoint is available along the route, controlling the charge port to transfer the allocated charge from the vehicle battery to the accessory device; and in response to a determination that the charging waypoint is not available along the route, allocating zero charge to the accessory device.

18. A non-transitory computer-readable medium having non-transitory computer-readable instructions encoded thereon that, when executed by processing circuitry, cause the processing circuitry to:

detect an accessory device coupled to a charge port of a vehicle, wherein the charge port is coupled to a vehicle battery of the vehicle;

determine an adventure waypoint;

determine energy requirements of the accessory device by estimating energy to be used by the accessory device at the adventure waypoint; and allocate charge from the vehicle battery to the accessory device based on a current state of charge (SOC) of the vehicle battery and the energy requirements of the accessory device.

19. The non-transitory computer-readable medium of claim 18, wherein execution of the non-transitory computer-readable instructions further causes the processing circuitry to:

retrieve an identifier from the accessory device connected to the charge port;

determine, based on the identifier, a type of the accessory device;

determine a current location of the vehicle; and determine the adventure waypoint based on the type of the accessory device and the current location of the vehicle.

20. The non-transitory computer-readable medium of claim 18, wherein execution of the non-transitory computer-readable instructions further causes the processing circuitry to:

determine an endpoint associated with a first charging station;

determine energy requirements of the vehicle to travel along a route to the endpoint with a stop at the adventure waypoint;

determine whether the current SOC of the vehicle battery is sufficient to meet the determined energy requirements of the vehicle;

in response to a determination that the current SOC of the vehicle battery is not sufficient to meet the determined energy requirements of the vehicle, determine whether a charging waypoint associated with a second charging station is available along the route to the adventure waypoint;

in response to a determination that the charging waypoint is available along the route, control the charge port to transfer the allocated charge from the vehicle battery to the accessory device; and in response to a determination that the charging waypoint is not available along the route, allocate zero charge to the accessory device.

* * * * *